US012473754B2

(12) United States Patent
Scheffler et al.

(10) Patent No.: US 12,473,754 B2
(45) Date of Patent: Nov. 18, 2025

(54) DOOR STRIKE HAVING A DEAD LATCH RELEASE

(71) Applicant: Hanchett Entry Systems, Inc., Phoenix, AZ (US)

(72) Inventors: Dominik Scheffler, Phoenix, AZ (US); Scott Sullivan, Cave Creek, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 479 days.

(21) Appl. No.: 17/223,489

(22) Filed: Apr. 6, 2021

(65) Prior Publication Data

US 2021/0222466 A1 Jul. 22, 2021

Related U.S. Application Data

(63) Continuation of application No. 16/816,369, filed on Mar. 12, 2020, now Pat. No. 11,414,891, which is a (Continued)

(51) Int. Cl.
*E05B 63/24* (2006.01)
*E05B 15/02* (2006.01)
(Continued)

(52) U.S. Cl.
CPC .......... *E05B 63/244* (2013.01); *E05B 15/024* (2013.01); *E05B 47/0046* (2013.01);
(Continued)

(58) Field of Classification Search
CPC .. E05B 47/0046; E05B 47/0047; E05B 63/24; E05B 63/244; E05B 63/248;
(Continued)

(56) References Cited

U.S. PATENT DOCUMENTS 1,059,530 A 4/1913 Dupuis
1,555,830 A 10/1925 Carroll
(Continued)

FOREIGN PATENT DOCUMENTS

DE 10116299 10/2002
DE 202004007910 7/2004
(Continued)

OTHER PUBLICATIONS

Merlino, Alyson Marie, "Final Office Action," issued for U.S. Appl. No. 12/851,848, filed Aug. 6, 2010, mailed on Mar. 13, 2013, Alexandria, VA.
(Continued)

*Primary Examiner* — Alyson M Merlino
(74) *Attorney, Agent, or Firm* — Woods Oviatt Gilman LLP; Dennis B. Danella, Esq.

(57) ABSTRACT

An actuator-controlled strike comprising a housing disposable within a doorframe and including a cavity for a spring latch and a dead latch of a mortise-type lockset. A keeper is pivotably mounted within the chamber to engage the spring latch. A pivotably mounted kicker cooperates with the keeper. A pivotably mounted dead latch release is supported by the keeper when the spring latch is within the strike. The keeper is released by the actuator and rotates into a position to ramp the spring latch out of the strike, also allowing the dead latch release to release the dead latch into the cavity, allowing the spring latch to be ramped out of the strike. Pivoting the keeper causes the kicker to urge the spring latch onto an exit ramp on a face of the keeper. The dead latch release can be installed in a plurality of different locations in the housing.

8 Claims, 8 Drawing Sheets

Related U.S. Application Data continuation of application No. 15/332,578, filed on Oct. 24, 2016, now Pat. No. 10,619,381, which is a continuation of application No. 14/179,011, filed on Feb. 12, 2014, now Pat. No. 9,476,227, which is a continuation of application No. 12/851,848, filed on Aug. 6, 2010, now Pat. No. 8,783,744.

(60) Provisional application No. 61/232,497, filed on Aug. 10, 2009.

(51) Int. Cl.
*E05B 47/00* (2006.01)
*E05B 63/00* (2006.01)
*E05B 63/04* (2006.01)

(52) U.S. Cl.
CPC .... *E05B 63/248* (2013.01); *E05B 2015/0265* (2013.01); *E05B 63/0056* (2013.01); *E05B 63/04* (2013.01); *Y10S 292/51* (2013.01); *Y10T 292/696* (2015.04); *Y10T 292/699* (2015.04); *Y10T 292/702* (2015.04); *Y10T 292/705* (2015.04)

(58) Field of Classification Search
CPC ............... Y10T 292/68; Y10T 292/696; Y10T 292/699; Y10T 292/702
See application file for complete search history.

(56) References Cited

U.S. PATENT DOCUMENTS

| | | | | |
|---|---|---|---|---|
| 3,638,984 | A | 2/1972 | Davidson | |
| 3,774,422 | A | 11/1973 | Hogan et al. | |
| RE30,263 | E | 4/1980 | Horvath | |
| 4,211,443 | A | 7/1980 | Butts et al. | |
| 4,626,000 | A | 12/1986 | O'leary | |
| 4,626,010 | A | 12/1986 | Hanchett, Jr. et al. | |
| 4,867,496 | A | 9/1989 | Thomas | |
| 5,118,150 | A | 6/1992 | Jarrett | |
| 5,118,151 | A | 6/1992 | Nicholas, Jr. et al. | |
| 5,127,691 | A * | 7/1992 | Herron | E05B 47/0047 292/144 |
| 5,195,792 | A | 3/1993 | Stendal | |
| 5,257,841 | A | 11/1993 | Geringer et al. | |
| 5,474,342 | A | 12/1995 | Smith et al. | |
| 5,484,180 | A | 1/1996 | Helmar | |
| 5,595,409 | A | 1/1997 | Fier et al. | |
| 5,681,070 | A | 10/1997 | Williams | |
| 5,735,559 | A | 4/1998 | Frolov | |
| 5,757,269 | A | 5/1998 | Roth et al. | |
| 5,934,720 | A | 8/1999 | Karalius | |
| 5,990,579 | A | 11/1999 | Ricci | |
| 6,022,056 | A | 2/2000 | Cope et al. | |
| 6,082,791 | A | 7/2000 | Frolov et al. | |
| 6,581,991 | B2 | 6/2003 | Galindo | |
| 6,588,155 | B1 | 7/2003 | Theune et al. | |
| 6,634,685 | B2 | 10/2003 | Herron et al. | |
| 6,874,830 | B2 | 4/2005 | Bashford | |
| 6,913,299 | B1 | 7/2005 | Stendal | |
| 6,935,663 | B2 | 8/2005 | Schildwachter et al. | |
| 6,966,585 | B2 | 11/2005 | Egi et al. | |
| 7,010,947 | B2 | 3/2006 | Milo | |
| 7,144,053 | B2 | 12/2006 | Bashford | |
| 7,185,928 | B1 | 3/2007 | Liao | |
| 7,273,241 | B2 | 9/2007 | Milo | |
| 7,540,542 | B2 * | 6/2009 | Geringer | E05B 47/0047 292/341.16 |
| 7,722,097 | B2 | 5/2010 | Schnarr et al. | |
| 8,132,833 | B2 | 3/2012 | Schnekenburger | |
| 8,146,966 | B1 | 4/2012 | Webb et al. | |
| 8,157,302 | B1 | 4/2012 | Webb et al. | |
| 8,783,744 | B2 | 7/2014 | Scheffler et al. | |
| 9,121,198 | B2 | 9/2015 | Gresser | |
| 9,476,227 | B2 | 10/2016 | Scheffler et al. | |
| 10,072,441 | B2 | 9/2018 | Singh | |
| 10,927,568 | B2 | 2/2021 | Singh | |
| 2003/0127869 | A1 | 7/2003 | Herron et al. | |
| 2003/0127870 | A1 | 7/2003 | Schildwachter | |
| 2004/0061343 | A1 | 4/2004 | Bashford | |
| 2005/0184539 | A1 | 8/2005 | Milo | |
| 2006/0192397 | A1 | 8/2006 | Schnarr et al. | |
| 2006/0226663 | A1 | 10/2006 | Liao | |
| 2007/0085354 | A1 | 4/2007 | Hirschoff | |
| 2007/0132250 | A1 | 6/2007 | Schnekenburger | |
| 2008/0191499 | A1 | 8/2008 | Stein | |
| 2008/0224481 | A1 | 9/2008 | Geringer et al. | |
| 2009/0072555 | A1 | 3/2009 | Holzer | |
| 2009/0188289 | A1 | 7/2009 | Orbeta | |
| 2010/0038920 | A1 | 2/2010 | Tsai | |
| 2010/0078944 | A1 | 4/2010 | Hirschoff | |
| 2010/0096864 | A1 | 4/2010 | Webb et al. | |
| 2010/0116006 | A1 | 5/2010 | Huang | |
| 2010/0127518 | A1 | 5/2010 | Huang | |
| 2010/0289279 | A1 | 11/2010 | Toma | |
| 2011/0031768 | A1 | 2/2011 | Scheffler et al. | |
| 2013/0009409 | A1 | 1/2013 | Chang | |
| 2013/0088023 | A1 | 4/2013 | Singh | |
| 2018/0347235 | A1 | 12/2018 | Singh | |

FOREIGN PATENT DOCUMENTS

| | | |
|---|---|---|
| DE | 10310403 | 9/2004 |
| DE | 102004012112 | 8/2005 |
| DE | 102005015248 | 10/2006 |
| DE | 102005048693 | 4/2007 |
| DE | 102007014324 | 10/2008 |
| EP | 0851077 | 7/1998 |
| KR | 200353556 Y1 * | 6/2004 |

OTHER PUBLICATIONS

Merlino, Alyson Marie, "Final Office Action," issued for U.S. Appl. No. 12/851,848, filed Aug. 6, 2010, mailed on Mar. 20, 2014, Alexandria, VA.

Merlino, Alyson Marie, "Final Office Action," issued for U.S. Appl. No. 14/179,011, filed Feb. 12, 2014, mailed on Jul. 25, 2016, Alexandria, VA.

Merlino, Alyson Marie, "Non-Final Office Action," issued for U.S. Appl. No. 12/851,848, filed Aug. 6, 2010, mailed on Aug. 15, 2012, Alexandria VA.

Merlino, Alyson Marie, "Non-Final Office Action," issued for U.S. Appl. No. 14/179,011, filed Feb. 12, 2014, mailed on Jan. 14, 2016, Alexandria, VA.

Merlino, Alyson Marie, "Non-Final Office Action," issued for U.S. Appl. No. 14/179,011, filed Feb. 12, 2014, mailed on Jul. 10, 2015, Alexandria, VA.

Merlino, Alyson Marie, "Non-Final Office Action," issued for U.S. Appl. No. 12/851,848, filed Aug. 6, 2010, mailed on May 31, 2013, Alexandria, VA.

Munns, Ben, "Patents Act 1977: Search Report Under Section 17," for Application No. GB1013446.8, Intellectual Property Office of Great Britain.

The National Locksmith Magazine, cover, Apr. 1986.

Van Beurden, Jason, "PCT International Search Report, " mailed Jul. 17, 2014 for application No. PCT/US2011/065198, European Patent Office, Rijswijk, NL 2280.

Van Beurden, Jason, "Written Opinion of the International Searching Authority," mailed Jul. 17, 2014 for application No. PCT/US2011/065198, European Patent Office, Rijswijk, NL 2280.

Ahmad, Faria F., "Non-Final Office Action," issued for U.S. Appl. No. 13/919,517, filed Aug. 26, 2013, mailed on Oct. 6, 2015, Alexandria, VA.

Ahmad, Faria, "Final Office Action," issued for U.S. Appl. No. 13/919,517, filed Aug. 26, 2013, mailed on Jul. 27, 2017, Alexandria, VA.

Ahmad, Faria, "Final Office Action," issued for U.S. Appl. No. 13/919,517, filed Aug. 26, 2013, mailed on May 6, 2016, Alexandria, VA.

(56) References Cited

OTHER PUBLICATIONS

Ahmad, Faria, "Non-Final Office Action," issued for U.S. Appl. No. 13/919,517, filed Aug. 26, 2013, mailed on Jan. 12, 2017, Alexandria, VA.
Baxter, M.A.Sc., IAIN, "Office Action," issued for C.A. App. No. 2,712,769 filed on Aug. 10, 2010, mailed on Feb. 29, 2016, Gatineau, QC.
Baxter, M.A.Sc., IAIN, "Office Action," issued for C.A. App. No. 2,712,769 filed on Aug. 10, 2010, mailed on Mar. 1, 2017, Gatineau, QC.
Hanchett Entry Systems, Inc., "Installation Instructions for the 900 Series Strike," 4 pages, Feb. 1986.
Hanchett Entry Sytems, Inc. "Price List for 900 Series Electric Strike," 2 pages, Jan. 1986.
Locksmith Ledger Magazine, p. 52, Dec. 1986.
Locksmith Ledger Magazine, pp. 113-114, Feb. 1986.
Ahmad, Faria F., "Non-Final Office Action", issued for U.S. Appl. No. 15/948,616, filed Apr. 9, 2018, mailed on Jun. 15, 2021, Alexandria, VA.

* cited by examiner

DOOR STRIKE HAVING A DEAD LATCH RELEASE

REFERENCE TO PRIOR APPLICATIONS

This application is a continuation of U.S. patent application Ser. No. 16/816,369, filed Mar. 12, 2020, which is a continuation of U.S. patent application Ser. No. 15/332,578, filed Oct. 24, 2016, now U.S. Pat. No. 10,619,381, which is a continuation of U.S. patent application Ser. No. 14/179,011, filed Feb. 12, 2014, now U.S. Pat. No. 9,476,227, which is a continuation of U.S. patent application Ser. No. 12/851,848, filed Aug. 6, 2010, now U.S. Pat. No. 8,783,744, which claims the benefit of U.S. Provisional Application No. 61/232,497, filed Aug. 10, 2009.

TECHNICAL FIELD

The present invention relates to strike mechanisms for electrically locking a door in a frame; more particularly, to such strike mechanisms wherein a door latch and dead latch are electrically retained or released by the strike; and most particularly, to an electrically-controlled strike having a pivotable keeper, pivotable kicker, and adjustably positionable pivotable dead latch release platform that all pivot together in synchronized motion to release a door latch from the strike.

BACKGROUND OF THE INVENTION

As is known in the art of door latching, typically an electrically-controlled strike is mounted in a frame portion of a door and engages a mortise-type lockset disposed on or in an edge portion of the door. Typically, the mortise-type lockset includes a spring latch and a dead latch that is linearly spaced-apart from the spring latch along the edge portion of the door. The spring latch is reciprocally moveable between an engaged position so that it can engage the strike, thereby to retain the door in a fastened state, and a release position, wherein the door is released from the fastened state and is free to open. The dead latch is reciprocally moveable between an enabled position (extended) that permits movement of the spring latch from the engaged position to the release position and a disabled position (depressed) that prohibits movement of the spring latch from the engaged position to the release position. The spring latch is resiliently biased into an engaged position and the dead latch is resiliently biased into the enabled position.

U.S. Pat. No. 6,581,991 B2, the relevant disclosure of which is incorporated herein by reference, discloses an electrically-controlled strike comprising a housing adapted to be mounted in a frame portion of a door and having a cavity with a forwardly disposed opening that is sized and adapted to receive a spring latch and a dead latch when the door is in the fastened state; a spring latch mounted for linear reciprocal movement in a longitudinal throw direction in the housing between an extended position and a retracted position; a dead latch mounted for linear reciprocal movement in the longitudinal throw direction in the housing between an advanced position and a withdrawn position; a head portion supported on the spring latch plunger and being selectively positionable at a selected head location in the opening of the cavity, the head portion being operative to engage spring latch bolt when the door is in the fastened state thereby to accommodate different locations of the spring latch on the edge portion of the door; a striker assembly supported on the dead latch plunger and including an ensemble of strike elements operative to define a strike surface for the dead latch and providing a portal for the spring latch at a selected portal location, the strike elements being selectively arrangeable into different configurations thereby to vary the selected portal location to accommodate different spring latch and dead latch arrangements (as found over a variety of mortise locksets); and a drive operative to reciprocally drive the dead latch from the advanced position to the withdrawn position and to advance the spring latch from the retracted position to the extended position. The invention provides a single electrically actuated door latch structure that can be customized to a variety of spring latch and dead latch arrangements.

The disclosed mechanism is complex, comprising a large number of components including an electric motor gear train, and worm gear drive; a multiple-component attack head subassembly for enabling and disabling the door spring latch; and a multiple-component strike element subassembly for enabling and disabling the dead latch. The attack head subassembly and the strike element subassembly are driven reciprocally in coordination by the electric motor gear train during operation of the mechanism.

What is needed in the art is a simplified electrically-controlled strike that can be customized to a variety of spring latch and dead latch arrangements and that has relatively few components operated simply by an electric solenoid.

What is further needed is a kicker disposed in the strike and cooperative with the keeper and spring latch to facilitate movement of the spring latch toward its released position.

It is a principal object of the present invention to reduce the cost and complexity of an electrically-controlled strike for a mortise door lockset and to improve spring latch release operation.

SUMMARY OF THE INVENTION

Briefly described, an electrically-controlled strike in accordance with the present invention comprises a rectangular housing disposable within the frame of a door pivotably mounted in the frame. The housing includes an elongate opening defining an entry chamber for a spring latch and a dead latch of a lockset in the door. An entrance ramp for the spring latch and dead latch extends from an edge of the housing. A keeper is pivotably mounted within the chamber to engage and retain the spring latch. A kicker is also pivotably mounted within the chamber and is interlocked with the keeper and engageable by the spring latch. A dead latch release platform is also pivotably mounted within the chamber and is supported at an opposite end by the keeper when the door latch is secured within the strike. When a release command is received, the keeper is released by means of a solenoid and rotates into a position from which the spring latch may be ramped out of the strike opening. The keeper rotation allows the dead latch release platform to pivot into the cavity, releasing the dead latch to be extended into the cavity which allows the spring latch to be ramped into the door. The pivot action of the keeper causes the kicker to engage the nose of the spring latch and urge the spring latch onto an exit ramp formed on a face of the keeper. The spring latch climbs the ramps and exits the strike over the entrance ramp as the door opens in the frame. The dead latch release platform can be installed in any of a plurality of different vertical locations in the housing opening to accommodate any of a plurality of different lockset arrangements.

In another aspect, an electric strike assembly is provided which includes a housing formed with a cavity therein, a keeper pivotably mounted in the cavity, and a dead latch release platform pivotably mounted in the cavity and configured to rotate independently of a rotation of the keeper. The electric strike assembly further includes an inhibitor configured to engage and disengage the keeper, and an actuator configured to control engagement and disengagement of the inhibitor with the keeper.

In yet another aspect, the present invention includes a method of releasing a spring latch from an electric strike assembly. The method comprises the step of mounting the electric strike assembly in an associated door jamb. The electric strike assembly comprises a housing formed with a cavity therein, a keeper pivotably mounted in the cavity, and a dead latch release platform pivotably mounted in the cavity and configured to rotate independently of the rotation of the keeper. The electric strike further includes an inhibitor configured to selectively interfere with the keeper to prevent rotation of the keeper, and an actuator configured to act upon the inhibitor to cause the selective interference with the keeper. The method further includes the step of controlling the actuator to act upon the inhibitor to cause the selective interference with the keeper.

BRIEF DESCRIPTION OF THE DRAWINGS

The present invention will now be described, by way of example, with reference to the accompanying drawings, in which.

Corresponding reference characters indicate corresponding parts throughout the several views. The exemplifications set out herein illustrates currently preferred embodiments of the invention, and such exemplifications are not to be construed as limiting the scope of the invention in any manner.

DESCRIPTION OF THE PREFERRED EMBODIMENTS

The present invention is broadly directed to an automated door latch release system that is adapted to be installed in a door jam or frame so that it can operate with a mortise-type lock with dead latch assembly such as those found in typical commercial and industrial applications. The present invention also encompasses a method for automated door release. The present invention is particularly adapted for use with security doors in industrial and commercial applications wherein the security system can be electronically activated to release the door so that it may be moved from a secured first door position wherein it is secured within the door jam to an open position. The automated door lock release, also referred to herein as an "electrically-controlled strike," is primarily adapted for use with a mortise-type dead latch assembly mounted in the door. Here, the mortise-type dead latch assembly includes a spring latch and a dead latch that are spaced-apart from one another along the edge of the door. Moreover, the present invention is specifically adapted to be mounted in the dimensions of a typical door jam, requiring no further modifications, other than the location of the dead latch platform, to interface with a variety of different styles of mortise-type dead locks.

Figure 1:
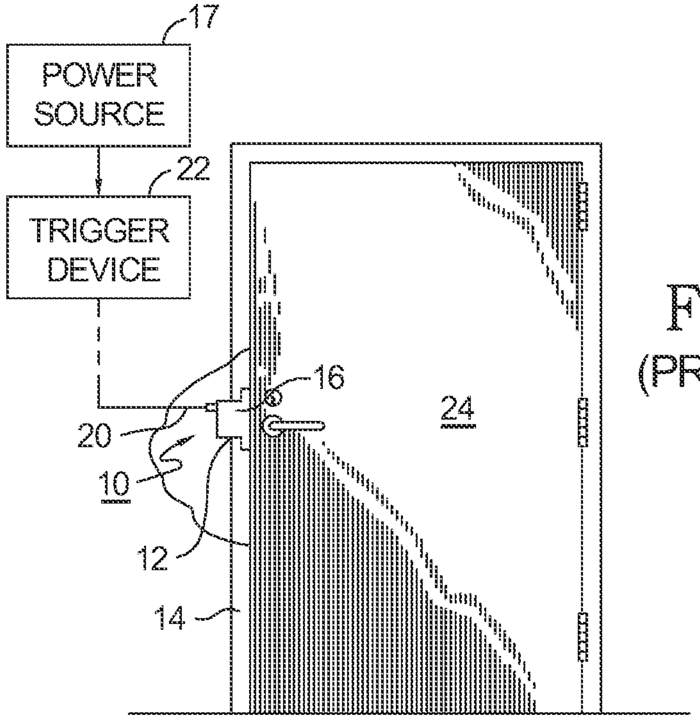
FIG. 1. (PRIOR ART)
FIG. 1 is a side elevational view of a door in a secure condition at a first door position within a door frame and having a portion of the door frame broken away to show an electrically-controlled strike in accordance with the present invention and operable with a mortise-type dead latch assembly of the door.

An automated door lock release or strike in accordance with the present invention is an improvement over the prior art automated door latch release disclosed in U.S. Pat. No. 6,581,991 B2 and is intended to function as a direct replacement thereof. Referring to FIG. 1, an embodiment of the invention disclosed in U.S. Pat. No. 6,581,991 B2 is in the form of a prior art automated door latch actuator 10 that is received in a cavity 12 in a typical door jam 14. Actuator 10 includes an outer housing 16 which mounts its electrical and mechanical components. The electrical components in turn are electrically in communication by means of wiring 20. Actuator 10, for example, may be electrically in communication with a source 17 of electrical power such as for example, a 12 or 24 volt circuit, and with a trigger device 22. Activation of the trigger device will cause the door latch actuator to activate. The trigger device 22 may typically be a switch whose contacts selectively actuate the door latch actuator. The trigger device 22, however, is often incorporated into a control entry device such as a card reader or digital entry keypad. Here, an authorized card is presented or an authorized code is entered into trigger device 22.

A typical door 24 is shown in FIG. 1 in a first or closed position. Again, for example purposes, door 24 may be pivotally mounted so that it can move between a closed position and an open position.

Figure 2:
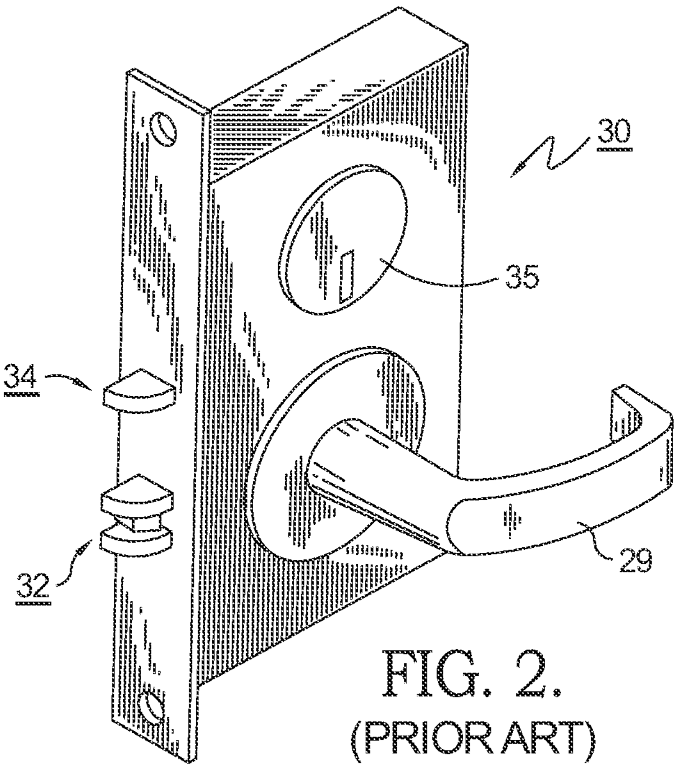
FIG. 2. (PRIOR ART)
FIG. 2 is an isometric view of a prior art mortise lockset for use with an electrically-controlled strike in accordance with the present invention.

Door latch actuator 10 is constructed to interface with a mortise-type lockset assembly 30 according to the prior art, exemplarily shown in FIG. 2. A prior art mortise-type lockset assembly 30 includes a spring latch 32 and a dead latch 34. Spring latch 32 and dead latch 34, when mounted in a door, are linearly spaced-apart from one another along the edge portion of the door. Both spring latch 32 and dead latch 34 are spring-biased to extend outwardly from lockset assembly 30. Thus, as one of ordinary skill in the art can appreciate, spring latch 32 is slideably moveable between an advanced or "engaged position", wherein the spring latch 32 is fully extended from the edge portion of the door such that it can engage the latch bolt receiving cavity 46 (FIG. 3), and a retracted or "release position" wherein spring latch 32 is retracted into the door and becomes disengaged from the latch bolt receiving cavity 46, allowing the door to open.

Dead latch 34 similarly is reciprocally moveable between an extended or "enabling position" and a depressed or "disabling position". As is known in the prior art, when the dead latch is held in its disabling position, it prevents ("disables") movement of the spring latch bolt from moving from the engaged position to the release position. However, when the dead latch extends into the enabling position, the spring latch bolt may reciprocate between the engaged position and the release position. In FIG. 2, dead latch 34 is shown in the extended or enabling position and spring latch 32 is shown in the engaged position. Spring latch 32 is free to be urged into lockset assembly 30 in response to an opening force on door 24 as by a user rotating the door handle 29.

Figure 3:
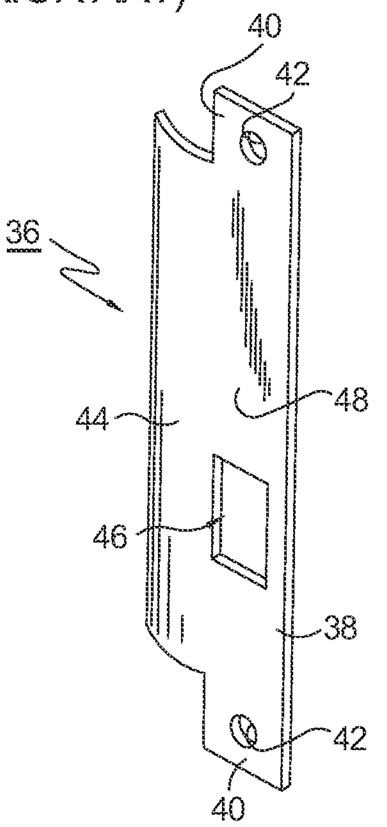
FIG. 3. (PRIOR ART)
FIG. 3 is a perspective view of a strike plate according to the prior art for use with a mortise-type dead latch assembly such as that shown in FIG. 2 which would be replaced by an electrically-controlled strike in accordance with the present invention.

With reference now to FIG. 3, a prior art strike plate 36 for use with mortise-type locksets of the prior art, such as lockset assembly 30, includes a rectangular central body portion 38 having oppositely projecting mounting tabs 40 provided with holes 42 adapted to receive screws for mounting on door jam 14. A lateral flange 44 projects away from central body portion 38 in a slightly curved configuration so as to interact with the curved edges of spring latch 32 and dead latch 34 when the door swings shut. A latch bolt receiving cavity 46, in the form of an opening, is provided in central body 38 of strike plate 36 so that, when the door closes, spring latch 32 extends into receiving cavity 46 to hold the door in the closed position. Dead latch 34, on the other hand, bears against the surface of strike plate 36 in the region designated 48 and is held in the depressed or disabling position thereby to lock the door. However, and with reference to FIG. 2, mortise-type lockset assembly 30 typically includes a key lock 35 that includes a mechanism to selectively retain spring latch 32 in the engaged position or to release spring latch 32 so that it may move between the engaged position and the release position. This construction is believed to be well-known to those skilled in the art and is not part of the present invention.

Figure 4A:
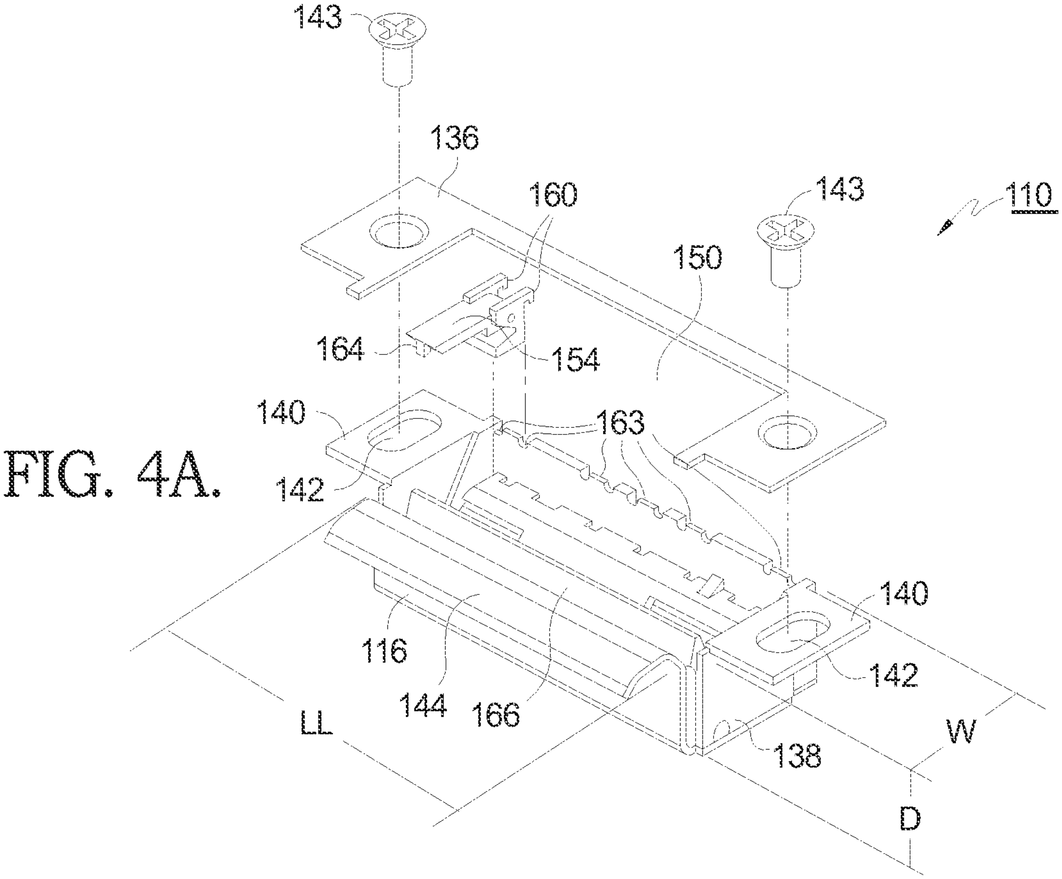
FIG. 4A is an exploded perspective view of a complete electrically-controlled strike in accordance with the present invention.
Figure 4B:
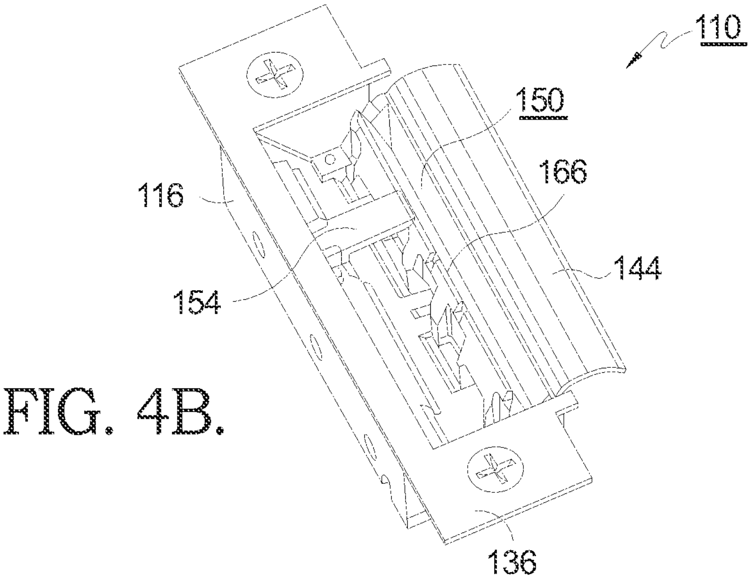
FIG. 4B is a perspective view of an electrically-controlled strike in accordance with the present invention.

Referring now to FIGS. 4A through 11, an improved electrically-controlled strike 110 in accordance with the present invention comprises a housing 116 including a rectangular central body portion 138 having oppositely projecting mounting tabs 140 provided with holes 142 for receiving screws 143. As best seen in FIG. 4A, housing 116 includes a longitudinal length (LL), a width (W), and a depth (D). An improved strike plate 136 having a central cutout portion 150 is adapted to fit over housing 116 to secure housing 116 via screws 143 into a cavity in a door jamb 14 as described above for prior art door latch actuator 10 (FIG. 1). Housing 116 is provided along an edge with a lateral flange 144 preferably running substantially the full longitudinal length LL of housing 116 that serves as an entry and exit ramp for a spring latch and dead latch as described below.

Figure 5:
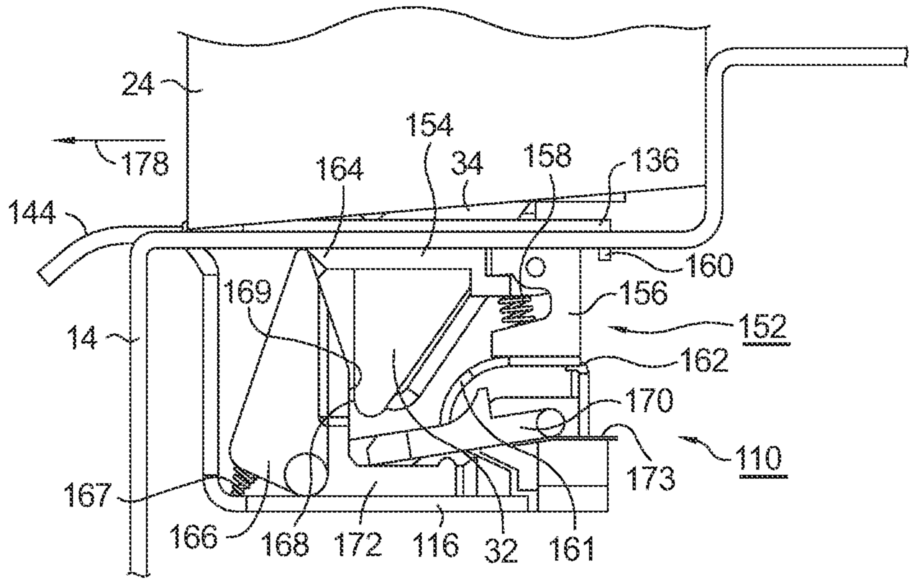
FIG. 5 is a cross-sectional view showing a door having a mortise lockset latched in a frame having an electrically-controlled strike in accordance with the present invention, the strike being in secured mode.

A dead latch release subassembly 152 (best shown in FIG. 9A) comprises a dead latch release platform 154 pivotably disposed in a platform mount 156. A compression spring 158 is disposed between platform 154 and mount 156 to resiliently urge subassembly 152 into the configuration shown in FIGS. 5 and 8. Platform mount 156 is provided with a pair of hooks 160 and a gib 162. Hooks 160 engage notches 163 (FIG. 4A) in a wall of housing 116 and gib 162 engages a supportive bench 161 (FIG. 5).

A first embodiment of the dead latch release subassembly 152 (FIG. 9A) includes a nose tang 164. A second embodiment of the dead latch release subassembly 152' (FIG. 9B) includes a roller 164' disposed in a fork 165, replacing tang 164.

A keeper 166 is pivotably mounted longitudinally of housing 116 and in the locked position (FIG. 5) engages nose tang 164 (or roller 164', not shown in FIG. 5) to support dead latch release platform 154 or 154'. Thus, when door lockset assembly 30 (FIG. 2) is in the locked mode, dead latch 34 is held in a depressed position in assembly 30 by release platform 154. Surface 169 of keeper 166 further engages lockset spring latch 32 along surface 168 and door opening force 178 is directed substantially perpendicular to surface 169, thus preventing door 24 from being opened. A return spring 167 disposed between keeper 166 and housing 116 urges keeper 166 toward the locked position shown in FIG. 5.

A kicker 170 is also pivotably mounted longitudinally of housing 116 and rests against a leg 172 of keeper 166. A return spring 173 is mounted on kicker 170 and constrained by body 116. Return spring 173 may be but is not limited to, a leaf, compression or torsion spring. As described in detail below, a solenoid is linearly operative against keeper 166 to selectively permit rotation of the keeper as described below when an unlocked mode for mechanism 110 is desired.

Figure 6:
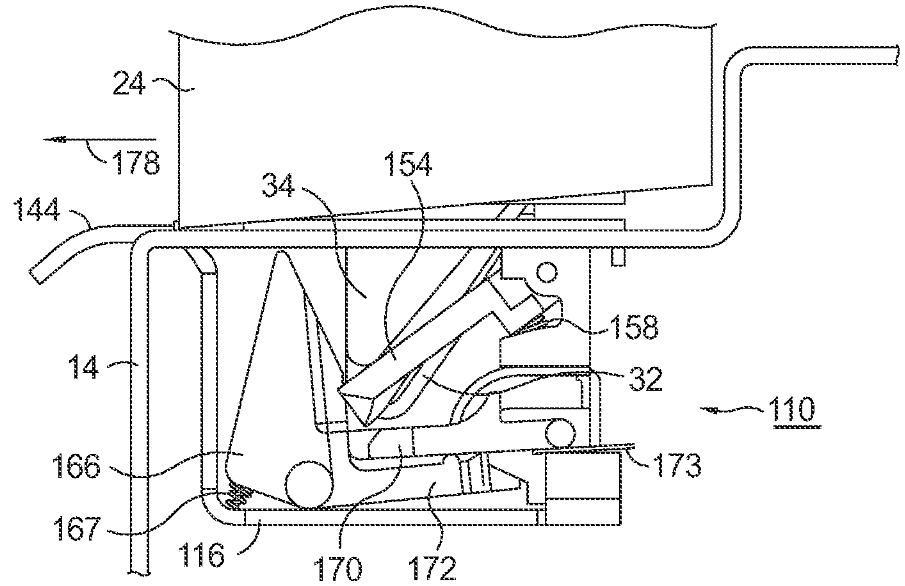
FIG. 6 is a cross-sectional view sequential to the view shown in FIG. 5, showing the strike in an early stage of unlocking the spring latch and dead latch of the mortise lockset.
Figure 7:
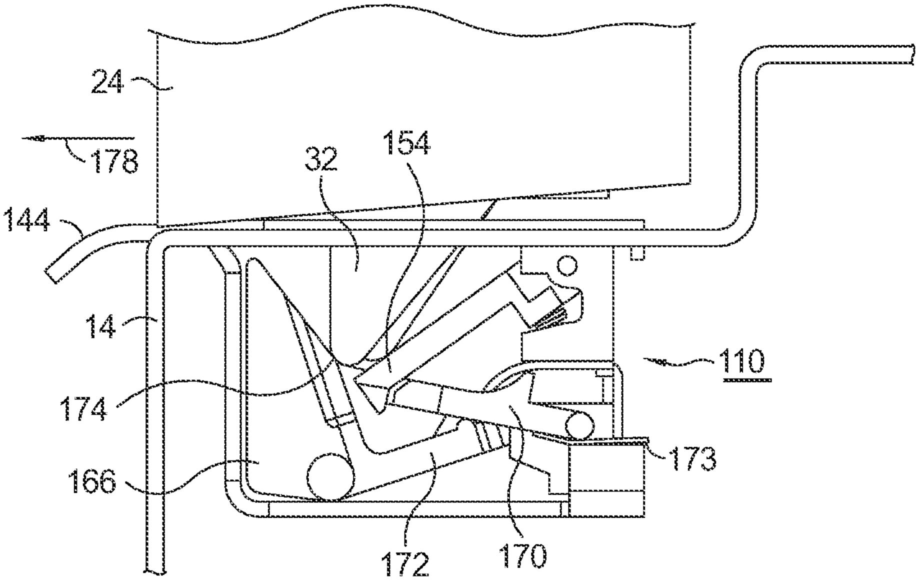
FIG. 7 is a cross-sectional view sequential to the view shown in FIG. 6, showing the strike in a later stage of unlocking the spring latch and dead latch of the mortise lockset.
Figure 8:
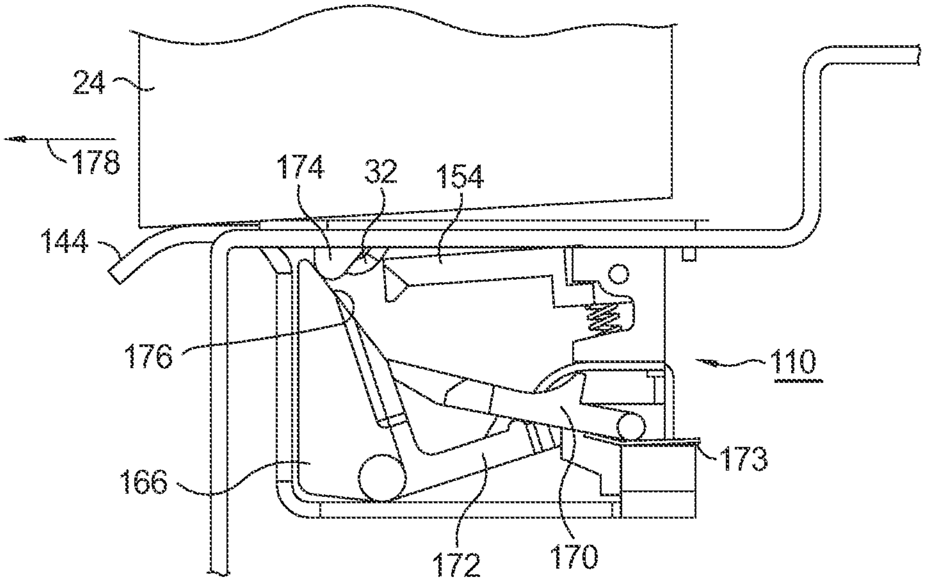
FIG. 8 is a cross-sectional view sequential to the view shown in FIG. 7, showing the strike in a late stage of unlocking the spring latch and dead latch of the mortise lockset.
Figure 9A:
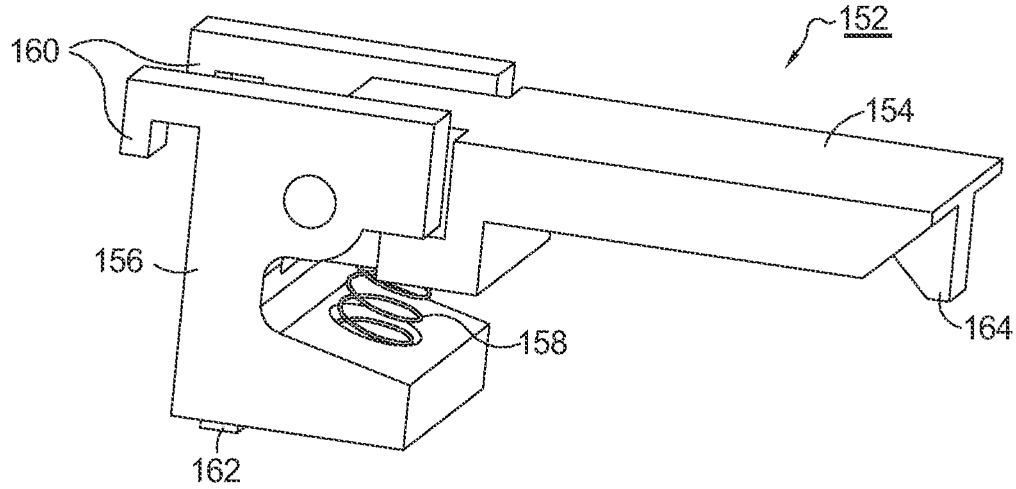
FIG. 9A is a perspective view of a first embodiment of dead latch release subassembly for use in an electrically-controlled strike in accordance with the present invention.
Figure 9B:
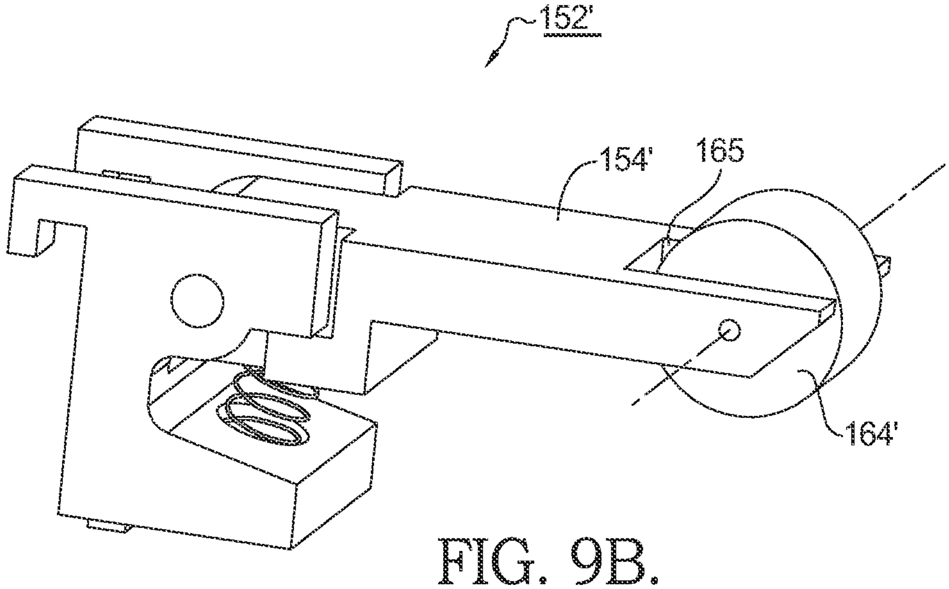
FIG. 9B is a perspective view of a second embodiment of dead latch release subassembly for use in an electrically-controlled strike in accordance with the present invention.

Referring to FIGS. 6 through 8, in operation of strike 110 the unlocking sequence is shown.

In FIG. 6, as keeper 166 begins to rotate counterclockwise in response to opening force 178 on door 24, nose tang 164 or roller 164' is no longer supported by keeper 166. Because spring 158 in subassembly 152 is deliberately provided to be weaker than the dead latch spring in mortise lockset 30, dead latch release platform 154 is caused by dead latch 34 to pivot in platform mount 156, allowing the dead latch to extend from door 24 into its extended, enabling position. Spring latch 32 is now free to be urged into lockset 30.

In FIG. 7, as keeper 166 continues to rotate counterclockwise, leg 172 urges kicker 170 to rotate correspondingly in a clockwise direction. Kicker 170 is so named because it literally kicks spring latch 32 out of locked engagement with keeper 166. When the nose 174 of spring latch 32 reaches the inclined surface 176 of keeper 166 (FIG. 7) by the action of kicker 170, opening force 178 on door 24 serves to cause nose 174 to slide along inclined surface 176 as spring latch 32 is further forced into lockset 30 until nose 174 reaches lateral flange 144 (FIG. 8) and door 24 is freed from engagement with strike 110.

Figure 10:
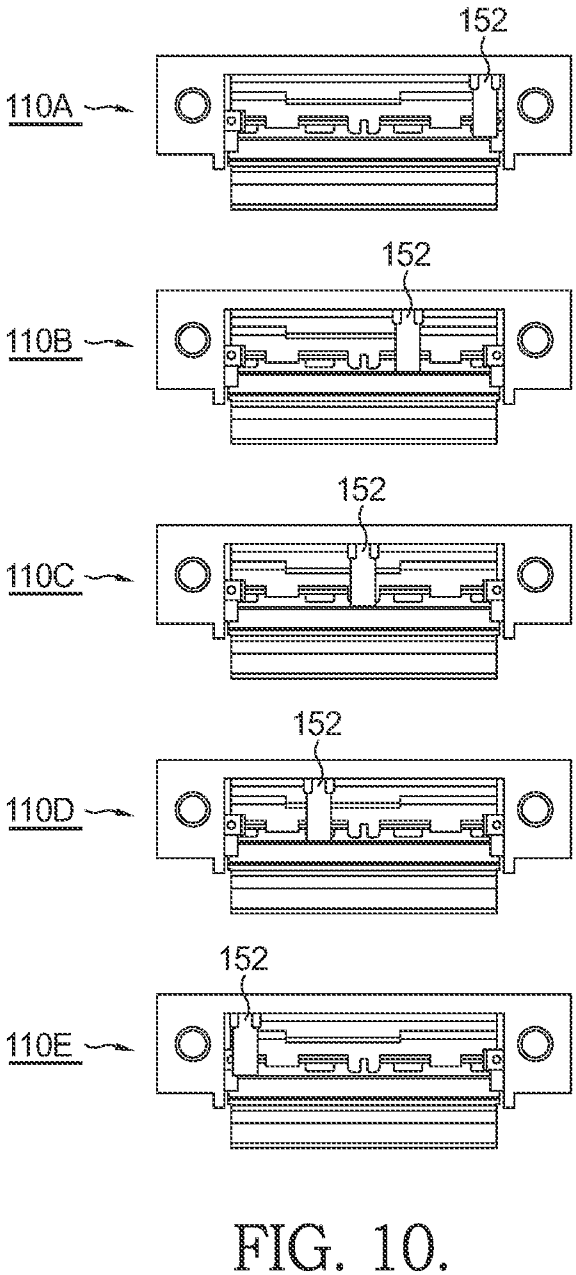
FIG. 10 is a plan view showing five different configurations for installation of the dead latch release subassembly, corresponding to five different mortise lockset arrangements of dead latch and spring latch.

Referring to FIG. 10, dead latch release subassembly 152 may be positioned in notch 163 (FIG. 4A) at any one of a plurality of positions, allowing strike 110 to be used with any of a plurality of mortise locksets having differing position arrangements of their dead latches and spring latches. In the example shown herein, strike 110 may accommodate five positions 110A through 110E of subassembly 152 corresponding to five sets of notches 163 in housing 116 (FIG. 4A). Moreover, because of the flexibility of strike 110 to accommodate various positions of the dead latch relative to the spring latch, strike 110 in accordance with the invention may be used, of equal utility, in either a right-hand-hinge or left-hand-hinge door frame.

Figure 11A:
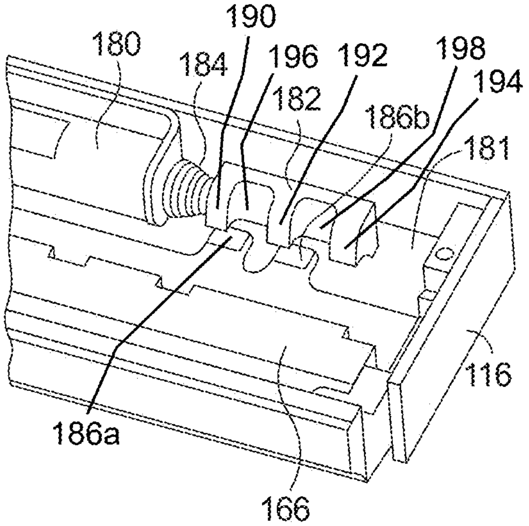
FIG. 11A is a perspective view of a solenoid actuation mechanism in accordance with the present invention, showing the strike in locked mode with a keeper engaged with first and second teeth of an inhibitor.
Figure 11B:
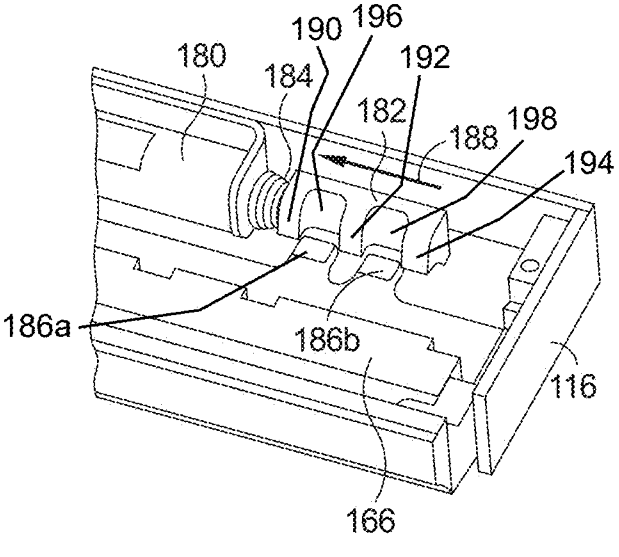
FIG. 11B is a perspective view of a solenoid actuation mechanism in accordance with the present invention, showing the strike in unlocked mode.
Figure 11C:
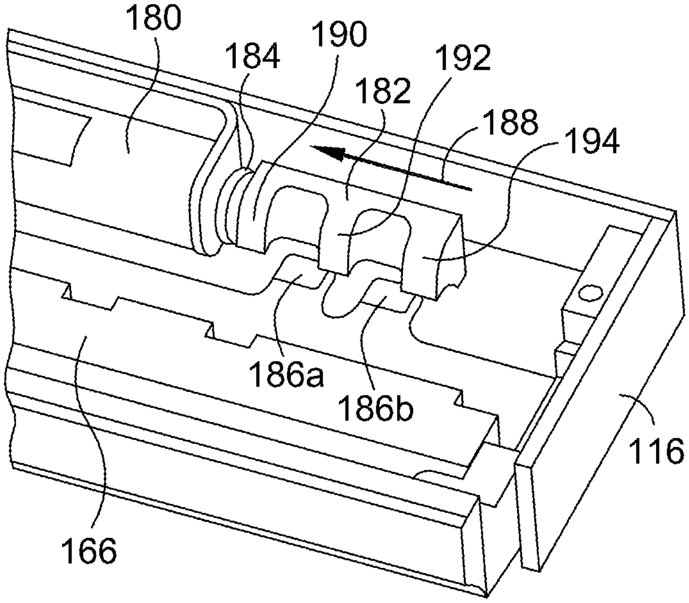
FIG. 11C is a perspective view of a solenoid actuation mechanism in accordance with the present invention, showing the strike in locked mode with the keeper engaged with second and third teeth of the inhibitor.

Referring to FIG. 11A, actuator 180, in the form of a linear-acting solenoid, is disposed in a cavity 181 in housing 116 and includes a plunger formed as an inhibitor 182. Inhibitor 182 includes a first tooth 190, a second tooth 192, and a third tooth 194, wherein a first recess 196 is defined between first and second teeth 190, 192, and wherein a second recess 198 is defined between second and third teeth 192, 194. A compression spring 184 disposed between actuator 180 and inhibitor 182 urges first and second teeth 190, 192 of inhibitor 182 into an interfering relationship with first and second mating teeth 186*a*, 186*b* on keeper 166 to prevent rotation of keeper 166, thereby locking spring latch 32 into strike 110 (FIG. 5) when actuator 180 is de-energized. Referring to FIG. 11B, when actuator 180 is energized, inhibitor 182 is moved in direction 188 to move first and second teeth 190, 192 of inhibitor 182 into a non-interfering relationship with first and second mating teeth 186*a*, 186*b* of keeper 166 to permit rotation of keeper 166 to release spring latch 32 from strike 110. Thus, the strike is in a "fail secure" mode meaning that, when solenoid 180 is not energized, the door is prevented from disengaging strike 110.

It should be noted that, by re-aligning inhibitor 182 relative to first and second mating teeth 186*a*, 186*b* on keeper 166 as shown in FIG. 11B, when actuator 180 is not energized, second and third teeth 192, 194 of inhibitor 182 can be moved into an interfering relationship with first and second mating teeth 186*a*, 186*b* of keeper 166 when actuator 180 is energized. By re-aligning inhibitor 182 in this manner, the strike can be transformed to operate in a "fail safe" mode (that is, when the solenoid is not energized, the door is permitted to disengage the strike).

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An electric strike assembly, comprising:

a) a housing formed with a cavity therein;

b) a keeper pivotably mounted in said cavity of said housing, wherein said keeper includes a first tooth and a second tooth;

c) a dead latch release platform pivotably mounted in said cavity of said housing and configured to rotate independently of a rotation of said keeper; and d) an actuator including an inhibitor, wherein said inhibitor includes a first tooth, a second tooth, and a third tooth, wherein a first recess is defined between said first tooth and said second tooth, wherein a second recess is defined between said second tooth and said third tooth, and wherein said inhibitor is selectively positionable in a fail-secure mode and a fail-safe mode, e) wherein when said inhibitor is in said fail-secure mode:
said actuator is configured to move said inhibitor between a first position and a second position,
wherein only said first and second teeth of said inhibitor are configured to directly engage said first and second teeth of said keeper, respectively, when said inhibitor is in said first position and said actuator is de-energized, and
wherein said first and second recesses are aligned with said first and second teeth of said keeper, respectively, when said actuator is energized and said inhibitor is moved to said second position, and f) wherein when said inhibitor is in said fail-safe mode:
said actuator is configured to move said inhibitor between said second position and a third position,
wherein said first and second recesses are aligned with said first and second teeth of said keeper, respectively, when said inhibitor is in said second position and said actuator is de-energized, and
wherein only said second and third teeth of said inhibitor are configured to directly engage said first and second teeth of said keeper, respectively, when said actuator is energized and said inhibitor is moved to said third position.

2. An electric strike assembly in accordance with claim 1 further comprising a compression spring disposed between said actuator and said inhibitor.

3. An electric strike assembly in accordance with claim 1 wherein said actuator is a solenoid.

4. An electric strike assembly in accordance with claim 3 wherein said solenoid is a linearly-acting solenoid.

5. A method of releasing a spring latch from an electric strike assembly, the method comprising:

a) mounting said electric strike assembly in an associated door jamb, said electric strike assembly comprising:
a housing formed with a cavity therein;
a keeper pivotably mounted in said cavity of said housing, wherein said keeper includes a first tooth and a second tooth;
a dead latch release platform pivotably mounted in said cavity of said housing and configured to rotate independently of a rotation of said keeper; and
an actuator including an inhibitor, wherein said inhibitor includes a first tooth, a second tooth, and a third tooth, wherein a first recess is defined between said first tooth and said second tooth, wherein a second recess is defined between said second tooth and said third tooth, and wherein said inhibitor is selectively positionable in a fail-secure mode and a fail-safe mode; and b) wherein when said inhibitor is in said fail-secure mode said inhibitor is in a first position and a second position, wherein said inhibitor is in said first position so that only said first and second teeth of said inhibitor are in interfering relationship with said first and second teeth of said keeper when said actuator is de-energized, and wherein when said actuator is energized said inhibitor is moved to said second position so that said first and second teeth of said keeper are aligned with said first and second recesses; and c) wherein when said inhibitor is in said fail-safe mode said inhibitor is in said second position and a third position, wherein said inhibitor is in said second position so that said first and second teeth of said keeper are aligned with said first and second recesses when said actuator is de-energized, wherein when said actuator is energized said inhibitor is moved to said third position so that only said second and third teeth of said inhibitor are in interfering relationship with said first and second teeth of said keeper.

6. A method in accordance with claim 5 wherein said electric strike assembly further comprises a compression spring disposed between said actuator and said inhibitor.

7. A method in accordance with claim 5 wherein said actuator is a solenoid.

8. A method in accordance with claim 7 wherein said solenoid is a linearly-acting solenoid.

* * * * *